(12) United States Patent
Samuelson et al.

(10) Patent No.: US 6,450,048 B1
(45) Date of Patent: Sep. 17, 2002

(54) HYDRAULIC CYLINDER MONITORING APPARATUS

(76) Inventors: Don S. Samuelson, 304 W. Myrtle St., Laurens, IA (US) 50554; James D. Homan, 307 Court St., Ida Grove, IA (US) 51445; Stephen B. Jones, 2035 Keystone Ave., Ida Grove, IA (US) 51445

( * ) Notice: Subject to any disclaimer, the term of this patent is extended or adjusted under 35 U.S.C. 154(b) by 0 days.

(21) Appl. No.: 09/503,131

(22) Filed: Feb. 11, 2000

(51) Int. Cl.$^7$ ................................................ G01D 21/00
(52) U.S. Cl. ...................................... 73/866.5; 73/168
(58) Field of Search ............................... 73/168, 866.5; 324/207.21, 207.24, 699; 338/39, 118, 154, 160, 184, 194, 197, 199; 92/5; 91/1

(56) References Cited

U.S. PATENT DOCUMENTS

| | | | |
|---|---|---|---|
| 3,355,690 A | * | 11/1967 | Sorensen et al. |
| 4,700,610 A | * | 10/1987 | Bauer et al. |
| 5,150,049 A | * | 9/1992 | Schuetz .................. 324/207.24 |
| 5,491,633 A | * | 2/1996 | Henry et al. ............ 324/207.24 |
| 6,029,693 A | * | 2/2000 | Nakanishi et al. |

OTHER PUBLICATIONS

Copy—2 pages from a publication entitled Machine Design—Best–Riding Sport Utes—second page showing a Stroke $mart cylinder—by Balluff Inc.; Jan. 2000.

Copy—16–page brochure entitled Compact HydraulicCylinders by Custom Actuator Products, Inc. of Golden Valley, MN, No Date.

* cited by examiner

*Primary Examiner*—Robert Raevis
(74) *Attorney, Agent, or Firm*—Henderson & Sturm LLP

(57) ABSTRACT

A hydraulic cylinder monitoring apparatus of a type having a tube with a first end and a second end and a removable first cap member for selectively closing the first end of the tube, the first cap member having a first opening therein. A second cap member is welded to the other end of said tube, the second cap having a second opening therein. A piston is sealingly disposed within the tube for movement between a first and a second position between the first and second ends of the tube. A rod is operatively attached to the piston and extends from the piston and through the first opening in the first cap member whereby the piston and rod can move together between the first and second positions. A first hydraulic fluid port extends into the tube adjacent said one end of the tube. A second hydraulic fluid port extends into the tube adjacent the second end of the tube. A supplemental cap is removably attached to the second cap member, the supplemental cap having a passageway therein. A transducer, including an elongated portion is removably fixed with respect to the supplemental cap, and a follower member is removably fixed with respect to said piston whereby when the piston moves, the follower member moves along the elongated portion of the transducer. Electrical wires are attached to and lead from the elongated portion of the transducer, the wires extending through the passageway in said supplemental cap whereby the position of the piston can be monitored with respect to the supplemental cap by using the transducer to sense the position of the follower member.

8 Claims, 3 Drawing Sheets

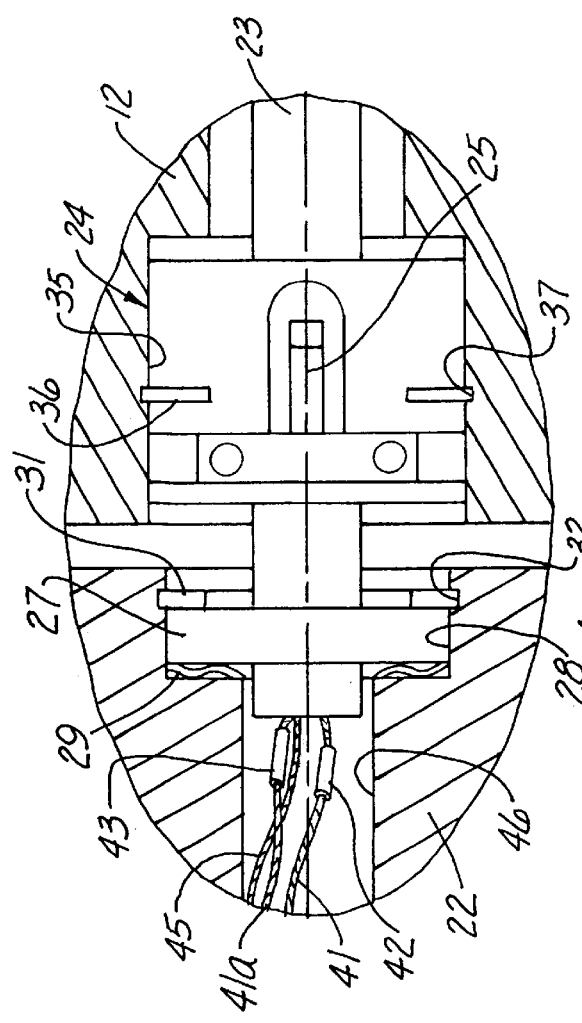

HYDRAULIC CYLINDER MONITORING APPARATUS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates generally to hydraulic cylinders, and more particularly to a hydraulic cylinder monitoring apparatus for a welded construction-type hydraulic cylinder.

2. Description of the Related Art

In general, hydraulic cylinders with operating pressures less than 5000 psi can be grouped into three (3) basic categories: (1) Low Cost Tie-Rod Construction; (2) Welded Construction; and (3) Industrial (Mill Type) Tie-Rod or Threaded Construction. The industrial type cylinders were the first group to actively employ linear transducers due to the nature of their applications. Linear transducers are used to monitor the position and/or movement of a piston or piston rod in a hydraulic cylinder. Since these applications commonly included in-plant equipment, machine tools and highly specialized uses, design of the equipment could be adjusted to accommodate the additional design requirements driven by adding linear transducers and their impact upon form, fit and function of the equipment. hi other words, the equipment could be designed to meet the constraints associated with incorporating a linear transducer into a cylinder.

As programmable Logic Controller (PLC) usage became more cost effective, original equipment manufacturer's (OEM's) producing mobile equipment have employed them to improve operator interface requirements (user friendly) as well as automate functions repeatedly used by the equipment. Many functions involved the use of cylinders as linear actuators. The position and movement of these actuators had to be monitored and communicated back to the PLC if closed-loop feedback control was to be utilized. Cylinders were capable of providing this feedback via the output of linear transducers. Placing the transducers inside cylinders inside of tie-rod or threaded construction hydraulic cylinders have provided the most direct method of incorporating them as well as protecting them from damage and environmental degradation.

As the majority of cylinders used in mobile equipment are of the welded construction type, the challenge has been to find a way of installing a linear transducer into a welded cylinder tube and provide access for serviceability and troubleshooting. Incorporating cylinders with transducers into mobile equipment creates additional challenges. The cylinder needs to be designed for the equipment rather than modifying the equipment design to accept the cylinder. Moreover, the ability to retrofit/upgrade existing equipment without extensive structural change requires direct interchangeability between "smart" and "dumb" cylinders which adds further design constraints. Consequently, before the present invention, there existed a need to solve the aforementioned problems.

BRIEF SUMMARY OF THE INVENTION

The present invention relates to a hydraulic cylinder monitoring apparatus of a type having a tube with a first end and a second end and a removable first cap member for selectively closing the first end of the tube, the first cap member having a first opening therein. A second cap member is welded to the other end of said tube, the second cap having a second opening therein. A piston is sealingly disposed within the tube for movement between a first and a second position between the first and second ends of the tube. A rod is operatively attached to the piston and extends from the piston and through the first opening in the first cap member whereby the piston and rod can move together between the first and second positions.

A first hydraulic fluid port extends into the tube adjacent said one end of the tube. A second hydraulic fluid port extends into the tube adjacent the second end of the tube. A supplemental cap is removably attached to the second cap member, the supplemental cap having a passageway therein. A transducer, including an elongated portion is removably fixed with respect to the supplemental cap, and a follower member is removably fixed with respect to said piston whereby when the piston moves, the follower member moves along the elongated portion of the transducer.

Electrical wires are attached to and lead from the elongated portion of the transducer, the wires extending through the passageway in said supplemental cap whereby the position of the piston can be monitored with respect to the supplemental cap by using the transducer to sense the position of the follower member.

An object of the present invention is to provide a welded construction type hydraulic cylinder with an apparatus for monitoring the position of the piston and/or piston rod of the hydraulic cylinder.

Another object of the invention is to provide a diagnostic device for helping to determine if an electrical problem is in a transducer of a monitoring system or in the wiring leading thereto.

Other objects, advantages, and novel features of the present invention will become apparent from the following detailed description of the invention when considered in conjunction with the accompanying drawings.

BRIEF DESCRIPTION OF THE SEVERAL VIEWS OF THE DRAWINGS

FIG. 5 is a cross sectional view of the hydraulic cylinder of the present invention having the monitoring apparatus disposed therein;

FIG. 6 is an enlarged view of the circled portion shown in FIG. 5;

DETAILED DESCRIPTION OF THE INVENTION

Figure 1:
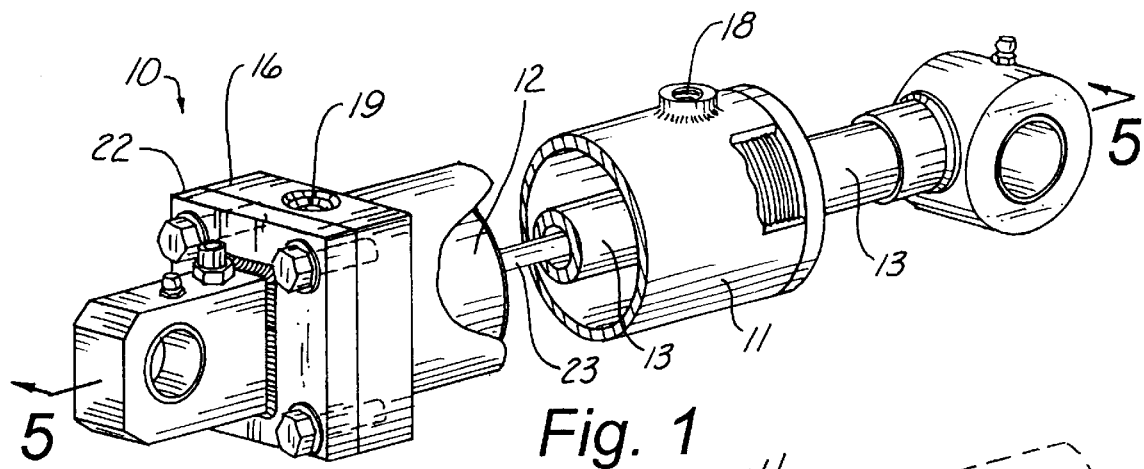
FIG. 1 is a perspective view of a preferred embodiment of the present invention showing a portion thereof broken away.

Referring now to the drawings, wherein like reference numerals designate identical or corresponding parts throughout the several views, FIG. 1 shows a hydraulic cylinder apparatus (10) constructed in accordance with the present invention. Referring to FIG. 5, as well as to FIG. 1, a cylindrical tube (11) has a piston (12) and a hollow piston rod (13) attached thereto inside of the cylindrical tube (11). A first cap member (14) is threadably engaged with threads on one end of the cylindrical tube (11). This first cap member has an opening so that the rod (13) can extend therethrough and be movable with respect to the cap (14) and cylindrical tube (11). A second cap (16) is welded at weld (17) to the cylindrical tube (11).

A first port (18) is on one end of the cylindrical tube (11) and a second tube port (19) is on the other side of piston (12) in the second cap member (16). The ports (18) and (19) are of the type on most hydraulic cylinders wherein pressure in one port and exhaust in the other will allow movement of the piston (12) in one direction and reversing the pressure and exhaust in these ports will cause the piston (12) and rod (13) to move in an opposite direction as is well known to those in this art.

Figure 2:
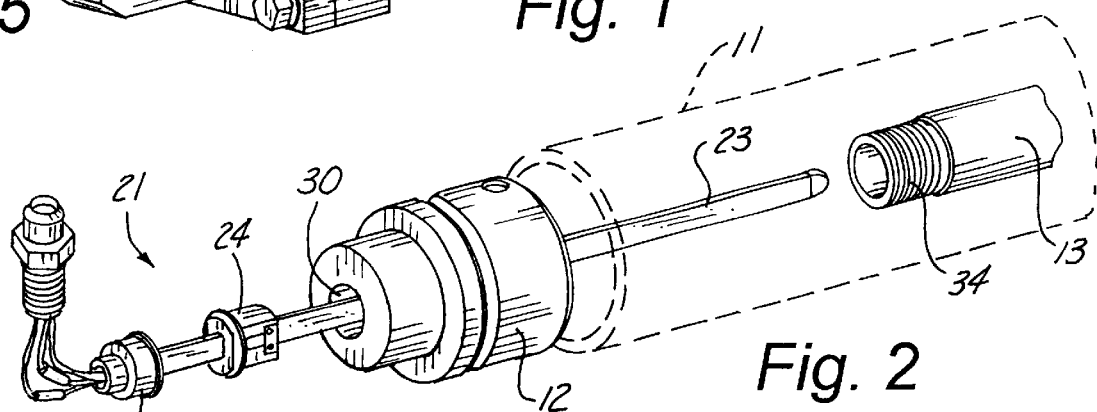
FIG. 2 is a partial perspective view of the piston and piston rod portion of the present invention with the transducer and wiring associated therewith shown.
Figure 3:
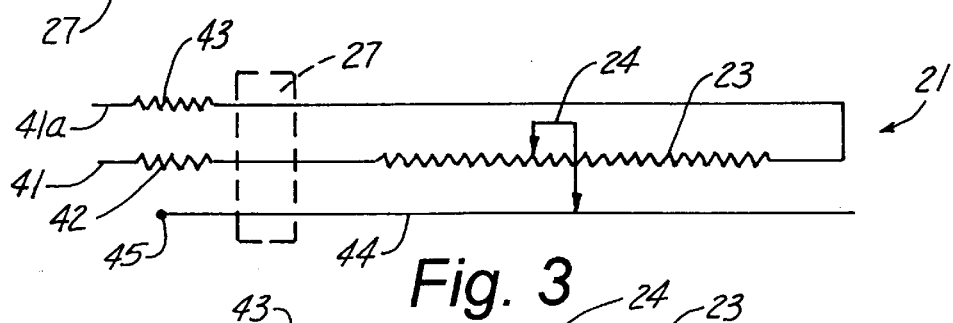
FIG. 3 is a schematic view of the transducer.

A transducer (21) is shown schematically in FIG. 3 and is shown in more detail in FIG. 2 and is used to provide an electrical sensing of where the piston (12) and/or rod (13) are positioned with respect to a supplemental cap (22). Resistance wand member (23) has a follower (24) with a brush member (25) as best shown in FIG. 6. A flange (27) is positioned within a recess (28) in the supplemental cap member (22). This flange member (27) has a wave spring (29) on one side thereof and is held in place by a snap ring (31) disposed in a recess (32) in the opening (28) in cap member (22). The resistive wand portion (23) extends into an elongated opening (33) within the rod (13), the rod (13) being attached to the piston (12) by threads (34) on the rod and threads (35) on the inside of the piston (12).

A follower (24) is attached inside of a recess (30) in piston (12) and a snap ring (36) holds the follower (24) in place in a groove (37) in the opening (35) of piston (12). Attached to the elongated resistance wand portion (23) is a wire (41) having a first resistor (42) attached thereto at the place near where the wire (41) extends through the flange (27) as can be seen in FIG. 3. The wire (41) also extends on the other side of the resistive wand portion (23) through the flange (22) to a second resistor (43). A conductive strip (44) associated with the elongated resistive want portion and extends through a flange (27) at wire (45). The follower (24) has the brush (25) thereon which is shown by the arrows in FIG. 3 to make contact with both the elongated resistive wand portion (23) and the conductive strip (44) as the follower (24) moves with the piston (12) along the resistive wand portion (23).

The wires (41), (41a) and (45) extend through a bore (46) in supplemental cap (22) and this bore (46) intersects with another bore (47) which extends completely through portion (20) of supplemental cap member (22). An access port (48) is disposed on one end of the bore (47) and a bore having an oil tight fitting (49) therein is attached in the other end of the bore (47) for holding the wires (41), (41a) and (42) as they extend out of the supplemental cap (22).

The access port (48) is useful to help guide the wires (41), (41a) and (45) in the installation and maintenance of the device (10). After the wires are in place, a cap closes the access port (48) to seal it from moisture or the like.

Figure 7:
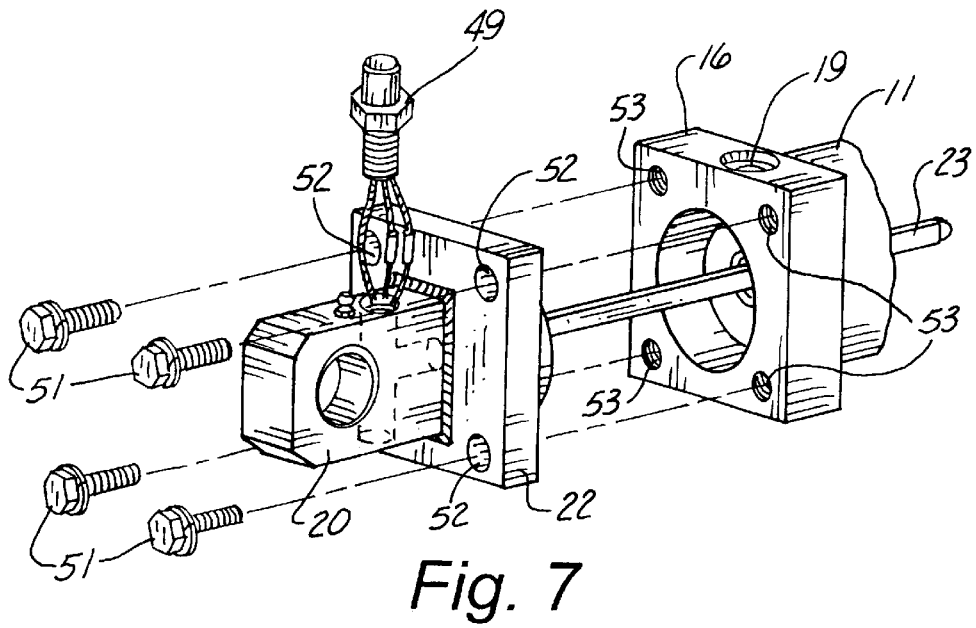
FIG. 7 is an exploded partial perspective view of the end of the hydraulic cylinder which has a cap welded thereto and looking at this portion from one angle thereof.
Figure 8:
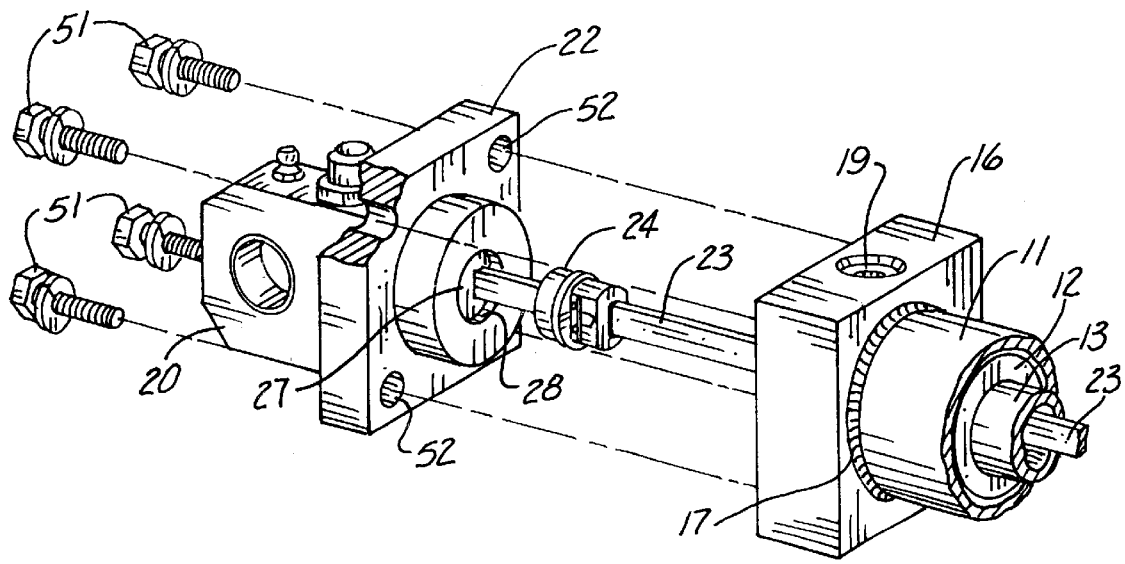
FIG. 8 shows the structure of FIG. 7 from a different angle in an exploded partial perspective view.

Referring to FIGS. 7 and 8, it is noted that the supplemental cap (22) is attached to the second cap member (16) by bolts (51) which extend through openings (52) in supplemental cap member (22) and extend into threaded openings (53) in the second cap member (16). Other ways of attaching supplemental cap (22) to the second cap member (16) can be used to make the supplemental cap removable and still be within the intended scope of the present invention. FIG. 8 shows where the cylindrical tube (11) is welded to the second cap member (16) and this is an important part of the invention since this type of cylinder is very different from a tie-rod or threaded construction-type cylinder, the threaded construction-type cylinder having transducers as shown in the prior art which have a cap on each end which is threaded to a cylindrical tube without the utilization of a weld to connect the cap to the cylinder.

Figure 4:
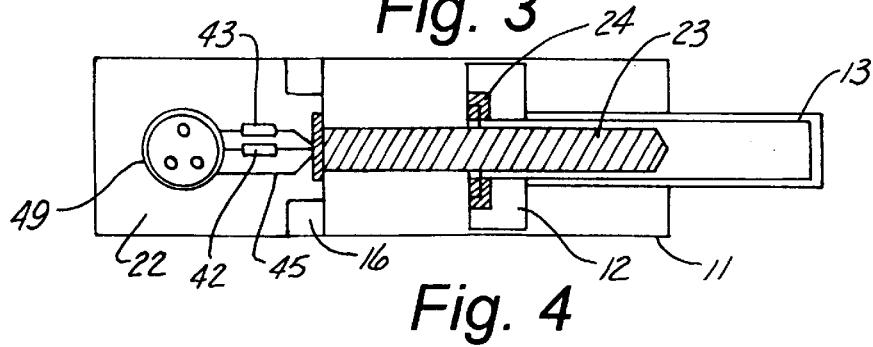
FIG. 4 is also a schematic view of the transducer in the hydraulic cylinder of the present invention.

FIG. 4 also shows a connector (49) which is of an oil-tight configuration which allows the oil to be in the bore (47), but which cannot exit the bore (47) because of the plugs in the access port (48) and because of this oil-tight connector (49).

In operation, the hydraulic cylinder (10) of the present invention would be connected at ends (53) and (54) to two objects that needed to be selectively controlled by being separated and then moved back together while the relative spacing is monitored by the transducer structure (23 and 24) of the present invention. So looking, for example, to FIG. 5, it is noted that a controller, not shown, is sensing the position of the piston (12) with respect to the cap (22) through the wires (41) and (41a) which have fixed resistors on these reference supply and/or ground return wires (41) and (41a). Similarly, the output wire (45) is connected to such controller (not shown).

When pressurized hydraulic oil is directed into port (19) and the oil on the right side of the cylinder shown in FIG. 5 is allowed to exit through port (18), the cylinder (12) moves to the right and the follower (24) will move with it. This will change the resistance as shown in FIG. 3 wherein the follower (24) moves along the elongated resistance wand portion (23). The transducer (23) and (24) shown in the present invention is a linear resistance type transducer but other types of transducers, such as a magneto-restrictive type, can be used instead of the linear resistance type transducer (23) and (24) shown in the drawings. Consequently, the position of the piston (12) and/or rod (13) can readily be monitored as the piston (12) and rod (13) move from one position to another within the cylinder (11). It should of course be understood that the follower (24) could be in the rod (13) instead of in the piston (12), i.e., the component to which the follower (24) is connected is not important.

Because the fixed resistors (42) and (43) are disposed within the steel confines of the supplemental cap (22) and its flange (20), there is very little chance that they can be damaged during the use of the device (10) of the present invention. The purpose of the fixed resistors (42) and (43) are as a diagnostic tool use-d in conjunction with the controller (not shown) so that, if there is a problem with the transducer circuit, it can be quickly determined whether it is within the wires (41), (41a) or (45) or whether the problem lies within the transducer (23) and (24) itself.

Accordingly, it will be appreciated that the hydraulic cylinder control apparatus (10) of the present invention allows the transducer to be attached at the welded end of the hydraulic cylinder (10) while allowing quick and easy accessibility for installation and/or servicing at a later time. It would not be feasible, without using the present invention, to weld a cap to a cylinder tube, especially on the end where a transducer is positioned, without subjecting the transducer inside to more heat than it can withstand. It will therefore be appreciated that the preferred embodiment shown herein does indeed accomplish the aforementioned objects. Obviously, many modifications and variations of the present invention are possible in light of the above teachings. It is therefore to be understood that, within the scope of the appended claims, the invention may be practiced otherwise than as specifically described.

We claim:

1. Hydraulic cylinder monitoring apparatus comprising:

a tube having a first end and a second end;

a removable first cap member for selectively closing the first end of the tube and having a first opening therein;

a second cap member welded to the other end of said tube, said seconds cap having a second opening therein;

a piston sealingly disposed within said tube for movement between a first and a second position between the first and second ends of the tube;

a rod operatively attached to said piston and extending from said piston and through the first opening in the first cap member whereby the piston and rod can move together between said first and second positions;

a first hydraulic fluid port extending into said tube adjacent said one end of said tube;

a second hydraulic fluid port extending into said tube adjacent said second end of the tube;

a supplemental cap removably attached to said second cap member, said supplemental cap having a passageway therein;

a transducer including an elongated portion removably fixed with respect to said supplemental cap and a follower member removably fixed with respect to said piston whereby when said piston moves, said follower member moves along said elongated portion of said transducer; and electrical wires attached to and leading from said elongated portion of the transducer, said wires extending through said passageway in said supplemental cap whereby the position of said piston can be monitored with respect to the supplemental cap by using said transducer to sense the position of the follower member.

2. The apparatus of claim 1 further comprising:

a first electrical resistor for diagnostic purposes attached to one of said electrical wires at a position within said passageway in said supplemental cap; and a second electrical resistor for diagnostic purposes attached to another one of said electrical wires at a position within said passageway, whereby the first and second resistors can be used to sense whether the electrical conductivity from the first and second resistors within said supplemental cap and another portion of the wires outside of said passageway is within acceptable limits, whereby having said first and second resistors within said passageway provides a protective environment and permits a user to quickly determine if a problem is in the wires leading to said transducer or in the transducer itself.

3. The apparatus of claim 1 wherein said supplemental cap includes a recess and a flange and said elongated portion is selectively locked into said recess for holding the elongated portion fixed with respect to said supplemental cap.

4. The apparatus of claim 1 wherein said passageway in said supplemental cap includes a longitudinal bore and a bore transverse to and connected to said longitudinal bore for permitting said wires to extend from said transducer, through said longitudinal and transverse bore to the outside of said supplemental cap.

5. The apparatus of claim 4 wherein said transverse bore extends completely through said supplemental cap, whereby said wires can be threaded out of one end of the transverse bore and be guided to that position from the other end of said transverse bore.

6. The apparatus of claim 1 wherein said first cap member is threadedly engaged with threads on the first end of the tube.

7. The apparatus of claim 1 wherein said supplemental cap is attached to said second cap member with threaded fasteners.

8. The apparatus of claim 7 wherein said threaded fasteners are bolts extending through holes in said supplemental cap and into threaded holes in said second cap member.

* * * * *

UNITED STATES PATENT AND TRADEMARK OFFICE
CERTIFICATE OF CORRECTION

PATENT NO.    : 6,450,048 B1
DATED         : September 17, 2002
INVENTOR(S)   : Don S. Samuelson et al.

It is certified that error appears in the above-identified patent and that said Letters Patent is hereby corrected as shown below:

<u>Title page,</u>
Item [73], Assignee, -- **Godbersen & Smith Construction Company,
d/b/a Gomaco Corporation**
Ida Grove, Iowa --

Signed and Sealed this

Eighth Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,450,048 B1
DATED : September 17, 2002
INVENTOR(S) : Don S. Samuelson et al.

It is certified that error appears in the above-identified patent and that said Letters Patent is hereby corrected as shown below:

<u>Title page,</u>
Item [73], Assignee, insert the following:

-- [73] Assignee: Godbersen & Smith Construction Company,
　　　　　　　　　　d/b/a Gomaco Corporation
　　　　　　　　　　Ida Grove, Iowa --

Signed and Sealed this

Fifteenth Day of June, 2004

JON W. DUDAS
*Acting Director of the United States Patent and Trademark Office*